UNITED STATES PATENT OFFICE.

EDWARD C. HOLTON, OF OLMSTED FALLS, OHIO, ASSIGNOR TO THE SHERWIN-WILLIAMS COMPANY, OF CLEVELAND, OHIO, A CORPORATION OF OHIO.

METHOD OF TREATING POLYSULFID SOLUTIONS.

14,890. Specification of Reissued Letters Patent. Reissued June 22, 1920.

No Drawing. Original No. 1,254,908, dated January 29, 1918, Serial No. 64,477, filed December 1, 1915. Application for reissue filed December 6, 1919. Serial No. 343,092.

*To all whom it may concern:*

Be it known that I, EDWARD C. HOLTON, a citizen of the United States, and a resident of Olmsted Falls, county of Cuyahoga, and State of Ohio, have invented a new and useful Improvement in Methods of Treating Polysulfid Solutions, of which the following is a specification, the principle of the invention being herein explained and the best mode in which I have contemplated applying that principle, so as to distinguish it from other inventions.

The present invention relates to a new and improved composition having insecticidal, fungicidal and fertilizer properties, and also to a method of producing such composition. The invention deals with polysulfids and particularly with calcium polysulfids. It is of course known that polysulfids of calcium are produced by the action of sulfur on mono sulfids, oxids and hydroxids of calcium under suitable conditions, and it is known that when lime sulfur is produced by boiling lime in water with sulfur, the polysulfid which is formed is chiefly the tetrasulfid of calcium, but when calcium sulfhydrate is boiled in water with sulfur the product is chiefly the pentasulfid of calcium. These polysulfids have been found to crystalize with a number of molecules of water as indicated by the formulas,—

$$CaS_4.9H_2O$$

or $$CaS_5x(H_2O).$$

The result of this crystallized water in the polysulfids is to render them very unstable in the air and to cause decomposition into sulfur and other substances which are very sparingly soluble in water. It is for the purpose of producing polysulfids which will be stable and which will not decompose while in the dry state, that the present invention has been designed. To the accomplishment of the foregoing and related ends, said invention, then, consists of the method hereinafter fully described and particularly pointed out in the claims.

The following description sets forth in detail one approved method of carrying out the invention, such disclosed mode, however, constituting but one of the various ways in which the principle of the invention may be used.

My improved method comprises the following steps. To a suitable solution of polysulfid, preferably having a specific gravity of practically 35° to 40° Baumé, I add a suitable water soluble substance in small amount, preferably from 1 to 5% of the weight of the polysulfid in solution. There are a number of substances which may be used for this purpose and which will have no deleterious action on the polysulfid and yet will have the stabilizing influence that is desired and among such substances are cane sugar saccharoses, glucoses, maltoses, dextarin and other soluble carbohydrates and the soluble substances formed by combining these with inorganic bases such as oxids of alkaline earth metal. Similarly suitable salts or formic, acetic and other organic acids as well as water soluble salts of sulfonic acids such for example as naphthol monosulfonates, may be used for this purpose. Among these various substances which may be used, cane sugar would preferably be employed in many cases as it exerts the necessary stabilizing and reinforcing effect on the polysulfid and has no deleterious action whatever, either on the nature of the polysulfid or on the use to which the final product is to be put.

This polysulfid solution to which cane sugar or another suitable water soluble substance has been added, is then evaporated to dryness, preferably under pressure lower than atmospheric, by any desired process, although one giving very good results consists in exposing the mixture of polysulfid and cane sugar on a heated surface in a very thin layer and for a very short space of time, preferably under pressure lower than atmospheric. The substance which then results from this evaporation is a mixture of polysulfids and cane sugar with almost no water of crystallization in the polysulfid which has been reinforced and stabilized by the presence of the cane sugar.

The final step in the process consists in finely pulverizing or grinding the dried product of the foregoing steps, thus producing a very fine powder which possesses very good insecticidal, fungicidal and fertilizing properties which is almost completely soluble in water and of which the only parts that are not soluble have very good suspension qualities so that this product is very well adapted for use as a spraying material.

Other forms may be employed embodying the features of my invention instead of the one here explained, change being made in the form of construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. An insecticide comprising essentially dry calcium polysulfid containing a much smaller percentage of a substance formed by the combination of a water-soluble carbohydrate and a polysulfid of an alkaline earth metal.

2. An insecticide, comprising a relatively large percentage of polysulfid of an alkaline earth metal and relatively small percentage of a carbon compound including an alkaline earth compound in its composition, said insecticide being substantially dry, relatively stable on storage, readily miscible with water to form lime sulfur solution and having the particles of lime sulfur intimately and homogeneously incorporated with such carbon compound.

3. An insecticide, consisting essentially of calcium polysulfid and containing a minor percentage of a water-soluble carbohydrate, said insecticide existing in the form of a fine dry powder and possessing insecticidal, fungicidal and fertilizing value, being almost completely soluble in water and having the water-insoluble ingredients thereof readily suspensible in water, said insecticide being adapted for use with water as a spraying material.

4. The method of producing a dry, stable polysulfid of an alkaline earth metal, having high insecticidal value, which consists in forming a solution the solid content of which comprises a major percentage of a polysulfid of an alkaline earth metal and a minor percentage of a water-soluble carbon compound which is capable of exerting a stabilizing influence upon the polysulfid when reduced to a dry state and then rapidly evaporizing the mixture *in vacuo* to a sufficient degree of dryness to produce a dry, stable, water-soluble product containing considerably less water of crystallization than is represented by the formula $CaS_4.9H_2O$.

5. The method of producing a dry, stable polysulfid of an alkaline earth metal, having high insecticidal value, which consists in forming a solution the solid content of which comprises a major percentage of a polysulfid of an alkaline earth metal and a minor percentage of a water-soluble carbon compound including an alkaline earth compound in its composition, which is capable of exerting a stabilizing influence upon the polysulfid when reduced to a dry state and then rapidly evaporating the mixture *in vacuo* to a sufficient degree of dryness to produce a dry, stable, water-soluble product containing considerably less water of crystallization than is represented by the formula $CaS_4.9H_2O$.

6. The method of producing a dry, stable polysulfid of an alkaline earth metal, having high insecticidal value, which consists in forming a solution the solid content of which comprises a major percentage of a polysulfid of an alkaline earth metal and a minor percentage of carbon compound adapted to serve in a protective capacity and prevent decomposition of said polysulfid and then rapidly evaporating the mixture *in vacuo* to a sufficient degree of dryness to produce a dry, stable, water-soluble compound containing considerably less water of crystallization than is represented by the formula $CaS_4.9H_2O$.

7. The method of producing a dry, stable polysulfid of an alkaline earth metal, having high insecticidal value, which consists in forming a solution the solid content of which comprises a major percentage of a polysulfid of an alkaline earth metal and a minor percentage of a water-soluble carbohydrate compound which has no deleterious action on such polysulfid and is capable of exerting a stabilizing influence upon the polysulfid when reduced to a dry state and then rapidly evaporating the mixture *in vacuo* to a sufficient degree of dryness to produce a dry, stable, water-soluble product containing considerably less water of crystallization than is represented by the formula $CaS_4.9H_2O$.

8. The method of producing a dry, stable polysulfid of an alkaline earth metal, having high insecticidal value, which consists in forming a solution the solid content of which comprises a major percentage of polysulfid of an alkaline earth metal and a minor percentage of a water-soluble sugar which is capable of exerting a stabilizing influence upon the polysulfid when reduced to a dry state and then rapidly evaporating the mixture *in vacuo* to a sufficient degree of dryness to produce a dry, stable, water-soluble product containing considerably less water of crystallization than is represented by the formula $CaS_4.9H_2O$.

9. In a method of stabilizing polysulfids, the step which consists in addition to a prepared polysulfid solution of specific gravity of 35°–40° Baumé or equivalent, of cane sugar in an amount equal to from one to five per cent., of the weight of polysulfid solution.

10. In a method of stabilizing polysulfids, the steps which consist in addition to a prepared polysulfid solution of 35°–40° Baumé, or equivalent, of cane sugar in an amount equal from one to five per cent. of weight of the solution, rapidly evaporating such solution to dryness, and then pulverizing the dried product.

11. An insecticidal compound comprising lime sulfur and cane sugar in the proportions of approximately eight to one.

12. In a method of stabilizing polysulfids, the step which consists in the addition to a prepared polysulfid solution of a substance formed by combining a water-soluble carbohydrate with an alkaline earth metal.

Signed at the city of Cleveland, county of Cuyahoga, State of Ohio, this 3rd day of December, 1919.

EDWARD C. HOLTON.